Dec. 3, 1935.  R. E. DAVIES  2,023,311
MINNOW TRAP
Filed Jan. 26, 1935  2 Sheets-Sheet 1
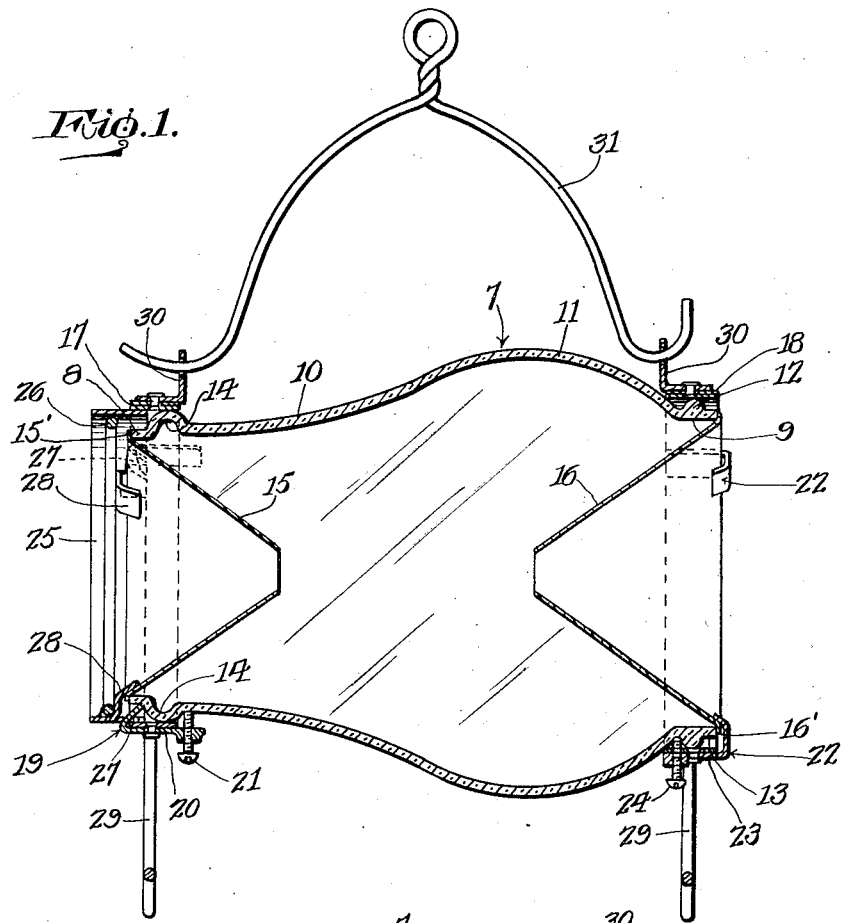
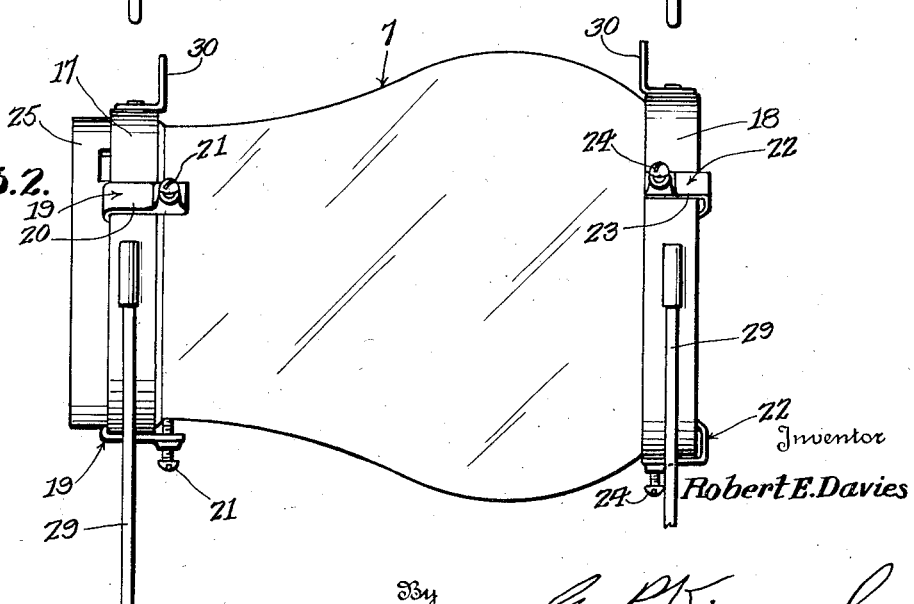
Inventor
Robert E. Davies
By Geo. P. Kimmel
Attorney Dec. 3, 1935.  R. E. DAVIES  2,023,311
MINNOW TRAP
Filed Jan. 26, 1935  2 Sheets-Sheet 2
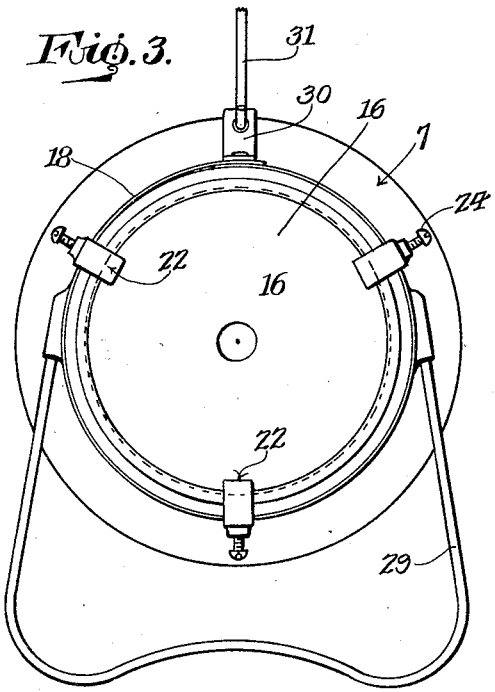
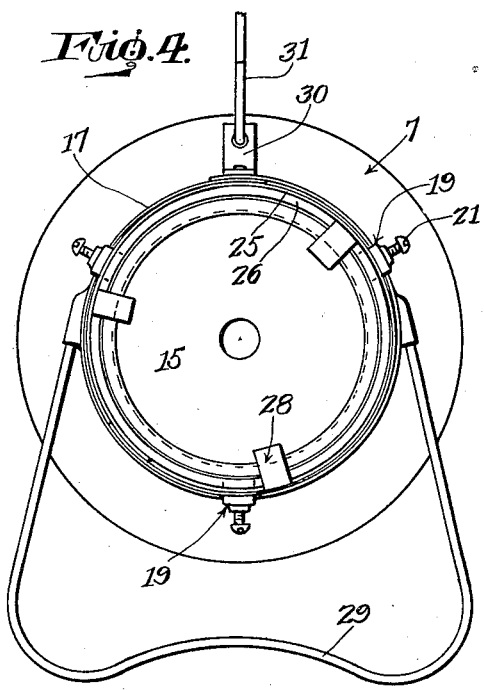
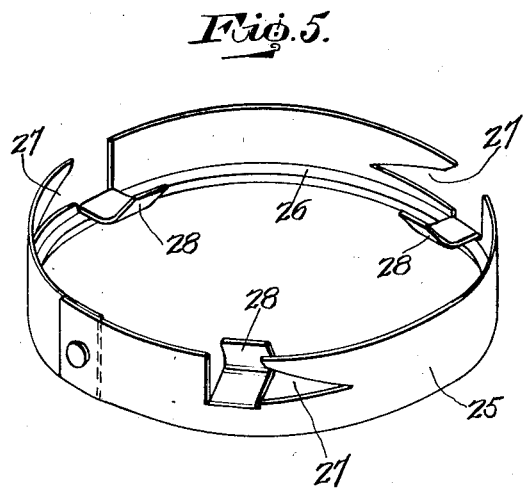
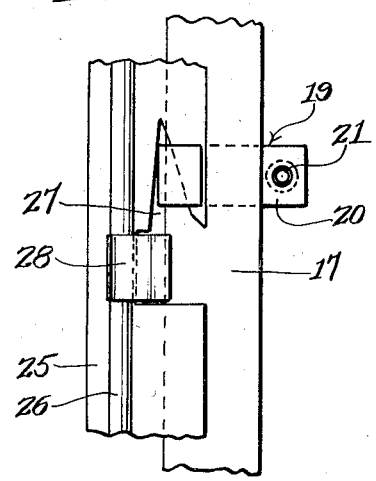
Inventor
Robert E. Davies
By Geo. P. Kimmel
Attorney Patented Dec. 3, 1935

2,023,311

UNITED STATES PATENT OFFICE 2,023,311

MINNOW TRAP

Robert E. Davies, Kokomo, Ind.

Application January 26, 1935, Serial No. 3,666

3 Claims. (Cl. 43—65)

This invention relates to a minnow trap.

The essential objects of the invention are to provide, in a manner as hereinafter set forth a construction of minnow trap which will enable the trapping of minnows from either end thereof; which will prevent the food therein from washing out; which will have the elements thereof so constructed and arranged as to enable one to readily see an obstruction therein; which will permit the same being thoroughly cleaned conveniently and expeditiously when occasion requires; which will permit the air bubbles to discharge therefrom irrespective of which end comes up after dropping or placing the trap in water; which will enable the substituting of a new for a damaged element at small replacement cost and without discarding the non-damaged elements thereof; which will be formed in a manner to provide it with permanently open ends; and which objects are obtained by a comparatively simple, strong, compact, readily assembled, thoroughly efficient, and inexpensive structure.

To the above ends essentially, and to others which may hereinafter appear, the invention consists of such parts, and such combination of parts, which fall within the scope of the invention as claimed.

In the drawings:

Figure 1 is a longitudinal sectional view of the trap.

Figure 2 is a fragmentary view in side elevation of the trap.

Figure 3 is a fragmentary view, in end elevation looking towards the largest end of the trap.

Figure 4 is a fragmentary view, in end elevation looking towards the smallest end of the trap.

Figure 5 is a perspective view of the locking ring.

Figure 6 is a fragmentary view, in side elevation looking toward the inner face of the smaller end of the trap.

The trap includes a tubular transparent container 7 which is open at each end. The container 7 at each end is formed with an annular rim. These rims are designated 8, 9 and the former is of less diameter than the latter. In transverse cross section the rim 9 is of greater length than rim 8. The container 7 is formed with a flared portion 10 which at its inner end merges into the inner end of a bulged rounded portion 11 of concave-convex contour in lengthwise section. The portion 11 is outset with respect to portion 10 and merges at its outer end into the inner end of the rim 9. The latter is formed on its outer face with an endless rounded rib 12 inwardly adjacent its outer edge 13. Interposed between the outer end of portion 10 and the inner end of the rim 8 is an outwardly directed annular bead 14 of semi-circular cross section. The bead 14 merges into the rim 8 and portion 10 and is outset with respect to the rim 8 and outer end of portion 10.

Extending into the container 7 from the open ends thereof is a pair of oppositely disposed transparent funnel shaped members 15, 16 acting as intakes and retainers. The smaller ends of the members 15, 16 are arranged within and adjacent to the open ends of the container. The members 15, 16 have their outer terminal portions 15', 16' positioned against the outer edges of the rims 8, 9 respectively. The said members are secured to the container 7 in a manner to be referred to. The member 16 is of greater diameter than member 15.

The trap includes a small and a large end ring 17, 18 respectively. The ring 17 is seated on and encompasses the bead 14. The ring 18 is seated on and encompasses the rib 12. Spaced retainer elements 19 are provided for the ring 17 and each includes an angle shaped strip 20 fixedly secured to ring 17 and abutting the outer side of bead 14. Each element 19 also includes an adjustable stop or binding screw 21 extending through the strip 20 and binding against the periphery of container 7 inwardly with respect to bead 14. Spaced retainer elements 22 are provided for the ring 18 and the funnel shaped retainer member 16. Each element 22 includes an angle-shaped strip 23 secured upon ring 13 and overlapping the outer terminal portion 16' of member 16 and bearing against the inner face of the latter. Each element 22 also includes an adjustable stop or binding screw 24 extending through strip 23 and ring 18 and binding against the periphery of container 7 inwardly with respect to rib 12.

The trap includes a reinforced locking ring 25 for the funnel shaped member 15. The ring 25 frictionally binds against the inner face of and projects outwardly from ring 17. The reinforcement for ring 25 is in the form of an annular member 26 of wire secured to its inner face. The ring 25 is formed with spaced cutouts 27 to provide clearance for the retainer elements 19. The ring 25 has struck therefrom spaced resilient inwardly extending angle-shaped arms 28 which bear against the member 26, overlap the outer terminal portion 15' and bear against the inner face of member 15.

Anchored at their upper ends to opposite sides of the ring 17 and to opposite sides of the ring 18 are parallel skeleton supports 29 for container 7. The tops of rings 17, 18 are formed with upstanding apertured ears 30 for pivotally connecting the ends of a bail 31 with the container 7.

What I claim is:

1. In a minnow trap a transparent tubular container open at each end, a transparent combined intake and retainer member of funnel like form extending into said container from each end thereof, the larger ends of said members being positioned at the open ends of the container, the ends of the container being of different diameters, said members being of different diameters with respect to each other, said container having an integral outwardly extended rim at each end formed with an annular offset part adjacent its free edge, a ring encompassing and seated upon the offset part of each rim, spaced means for securing one of said rings and one of said members to the container, an annular structure extending from the other of said rings and provided with spaced means for securing the other of said members to the container, and spaced means common to the said structure and the said other ring for securing them to said container.

2. In a minnow trap, a transparent tubular container open at each end and having an annular peripheral offset part in proximity to each end edge thereof, a pair of rings, each being seated against and encompassing one of said parts, a pair of oppositely disposed endwise aligning spaced funnel shaped combined intake and retaining members, each being arranged within and having its outer end overlapping an end edge of the container, means common to one of said rings and one of said members for securing them to the container, an annular element extended within the other of said rings and provided with rearwardly extending means for securing the other of said members to the container, and spaced means common to the other of said rings and said element for securing them to the container.

3. In a minnow trap, a transparent tubular container open at each end and having an annular peripheral offset part in proximity to each end edge thereof, a pair of rings, each being seated against and encompassing one of said parts, a pair of oppositely disposed endwise aligning spaced funnel shaped combined intake and retaining members, each being arranged within and having its outer end overlapping an end edge of the container, means common to one of said rings and one of said members for securing them to the container, an annular element extended within the other of said rings and provided with rearwardly extending means for securing the other of said members to the container, and spaced means common to the other of said rings and said element for securing them to the container, said element being slitted for the passage of the said spaced means.

ROBERT E. DAVIES.